July 26, 1927.  1,636,751
D. L. MILLSAP
GAMBREL
Filed July 30. 1925
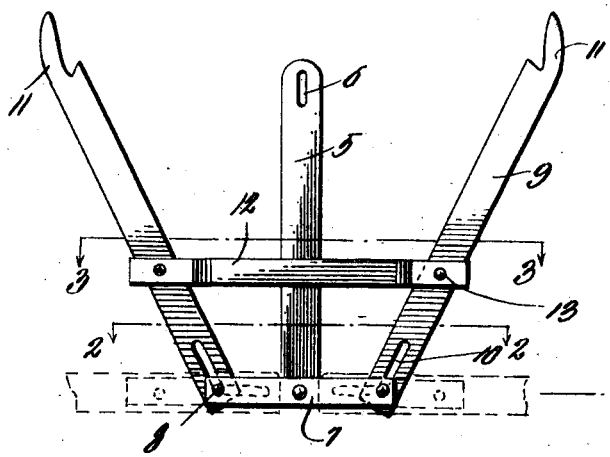
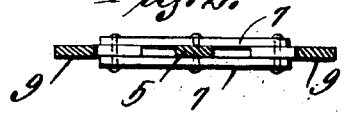
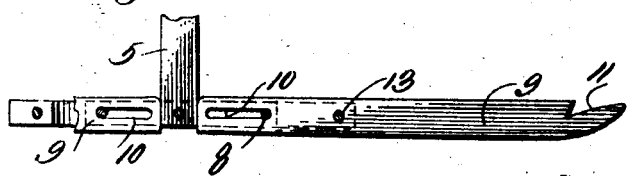
WITNESSES
DAVID L. MILLSAP Inventor
By Richard B. Owen Attorney Patented July 26, 1927.

1,636,751

UNITED STATES PATENT OFFICE.

DAVID L. MILLSAP, OF POWERSVILLE, MISSOURI.

GAMBREL.

Application filed July 30, 1925. Serial No. 47,105.

This invention relates to improvements in gambrels and has for its prime object to provide an apparatus for suspending carcasses to facilitate the cleaning thereof.

A further object of the invention is to provide a gambrel which will spread the legs of the animal directly in proportion to the weight thereof.

A still further object of the invention is the provision of a gambrel which will securely retain a carcass in a suspended position and at the same time cause the hind legs of the carcass to be held in a separated position.

Still another object of the invention is the provision of a gambrel of the above character which is comparatively simple yet durable in construction and which can be placed upon the market at a relatively low cost.

Other objects and advantages of this invention will become apparent as the description progresses.

In the accompanying drawing forming a part of this specification and in which like numerals are employed to designate corresponding parts throughout the same:

Figure 1 is a side elevation of a gambrel constructed in accordance with my invention, in a partially closed position, Figure 2 is a horizontal sectional view taken on the line 2—2 of Figure 1, Figure 3 is a horizontal sectional view taken on the line 3—3 of Figure 1, and Figure 4 is a fragmentary view of the apparatus in its open position.

In the drawing, wherein for the purpose of illustration is shown the preferred embodiment of my invention, the numeral 5 generally designates the main support bar which extends vertically through the center of the apparatus and is preferably rectangular in cross section. This bar is preferably of metallic construction and provided adjacent its upper extremity with a longitudinal recess 6 adapted to permit convenient attachment of a cable or like device from which the apparatus is suspended.

Secured to the lower extremity of the main support bar 5 are a pair of stationary support bars 7 extending transversely of the main bar 5 in parallel positions at each side thereof. These bars are immovably secured to the main support bar and are provided at their outermost extremities with pivot pins 8 which pass through the bars and are firmly secured against displacement.

Pivotally mounted on the ends of the stationary transverse bars 7 are a pair of gambrel arms 9, the lower ends being provided with longitudinal slots 10 engageable with the pivot pins 8 and the upper ends bifurcated to form engaging fingers 11. These fingers are preferably of arcuate formation so as to securely engage a carcass and prevent its displacement. As can be readily noted from the foregoing construction, the gambrel arms 9 may be readily swung about the pivot pins 8, the lower extremities of the arms moving inwardly toward the main support bar 5 as the arms travel from a vertical to a horizontal position. In the latter position, the lower ends of the gambrel arms will contact with the lower extremity of the main support bar and will be held against further downward movement as will be hereinafter more completely described.

Fulcrumed to the intermediate portions of the gambrel arms 9, preferably below the center thereof, are a pair of complementary traveler bars 12, these bars extending transversely of the apparatus and arranged in horizontal alignment. These traveler bars 12 are connected to the gambrel arms 9 by means of pivot pins 13 passing through the ends of the bars 12 and the gambrel arms. The intermediate portions of the traveler bars are offset to provide outwardly extending U-shaped members 14 so as to permit movement beside the stationary bars 7.

In use, the device is particularly intended for the suspension of carcasses and adapted to retain the hind legs of the animal in a separated position so that the carcass may be conveniently cleaned. This may be accomplished by arranging the apparatus in a folded position, as shown to advantage in Figure 1, and securing the hind legs of the carcass upon the fingers 11 of the gambrel arms. The gambrel and carcass may be then elevated by a suitable mechanism and retained in a suspended position. The weight of the carcass will cause the gambrel arms 9 to be swung in a downward arc approaching a horizontal position and thus inducing the legs of the animal to be spread apart a distance corresponding to the weight.

As will be readily observed the heavier animals will induce the gambrel arms 9 to swing downwardly to a horizontal position whence the adjacent extremities will be tightly wedged against the vertical support bar 5. In this position the movable traveler bars 12 will be positioned adjacent the stationary bars 7 so that the legs of the carcass will be spread the greatest possible distance. If desirable, however, the stationary bars may be formed so as to extend straight across the faces of the gambrel arms and in the lowermost position of the arms the traveler bars would rest upon the stationary bars 7. It is to be particularly noted that the simultaneous outward movement of the gambrel arms 9 is controlled by the weight of the animal suspended thereon, the distance between the arm fingers 11 varying directly with the weight of the carcass so that the legs of the heavier animal will be spread a greater distance which is necessary to permit convenient cleaning of the animal.

It is to be understood that the form of my invention herewith shown and described is to be taken as the preferred example of the same, and that various changes as to the shape, size and arrangement of parts may be resorted to without departing from the spirit of the invention or the scope of the subjoined claims.

Having thus described my invention, I claim:

1. A gambrel comprising a vertical support bar, a pair of complementary transverse support bars secured at the intermediate portions to the vertical support bar, the outer ends of the said transverse bars having pins inserted therethrough, a pair of spreading arms provided with slots on their lower ends engageable with the pins carried by the transverse bars and having engaging fingers formed on the outer swinging ends, and a pair of complementary traveler bars having their ends pivotally connected to the intermediate portions of the spreading arms so as to permit outward swinging movement of the arms, the lower ends of the arms being arranged, in the outer horizontal position of the arms, to engage the central support bar so as to be firmly wedged against further movement.

2. In a gambrel including a vertical support bar, a transversely extending support member rigidly secured to the lower end of the support bar, a pair of transversely extending pins secured to the outer remote ends of the said transverse support member, a pair of spreading arms provided with elongated slots in their lower ends engageable with the pins mounted in the outer end of the transverse support bar, and a transversely extending traveler bar vertically slidable on the vertical support bar and having its outer remote ends pivotally connected with the intermediate portions of the spreading arm adapted to direct the arms in outward arcs as the traveler bar descends and cause the arms to be locked in outwardly directed positions at the lowermost position of the traveler bar.

In testimony whereof I affix my signature.

DAVID L. MILLSAP.